United States Patent [19]

Heidlas et al.

[11] Patent Number: 5,718,937
[45] Date of Patent: Feb. 17, 1998

[54] PROCESS FOR THE EXTRACTION OF NATURAL AROMAS FROM NATURAL SUBSTANCES CONTAINING FAT AND OIL

[75] Inventors: Jürgen Heidlas; Ralf Kahleyss, both of Trostberg; Andrea Simon, Chieming, all of Germany

[73] Assignee: SKW Trostberg Aktiengesellschaft, Trostberg, Germany

[21] Appl. No.: 556,488

[22] Filed: Nov. 13, 1995

[30] Foreign Application Priority Data

Nov. 14, 1994 [DE] Germany ............... 44 40 644.4

[51] Int. Cl.$^6$ ........................................ A23L 1/22
[52] U.S. Cl. ............... 426/533; 426/474; 426/475; 426/489; 426/534; 426/617; 426/631; 426/632; 426/634
[58] Field of Search ......................... 426/533, 475, 426/489, 534, 650, 474, 615, 617, 629, 631, 632, 634

[56] References Cited

U.S. PATENT DOCUMENTS 4,123,559  10/1978  Vitzthum et al. ................. 426/312

FOREIGN PATENT DOCUMENTS 0065106  11/1982  European Pat. Off.
2632826  12/1989  France.

OTHER PUBLICATIONS

Heidlas, J.E., 95(07):E0021 FSTA, Abstracting Food Marketing & Technology, (1994) 8(6) 38–40, 42–43.
Moates et al., 91(09):A0019 FSTA, Abstracting Food Science & Technology Today (1990) 4(4) 213–214.
Suntory Ltd., 86–157844 WPIDS Abstracting JP 06006028 B2 Jan. 1994.
Database WPI, Section Ch, Week 9238; Derwent Publications Ltd. London, GB; Class D13, AN 92–311149 & JP-A-04 214 799 (Hasegawa Co Ltd); Aug. 5, 1992; *Zusammenfassung*.
Database WPI, Section Ch, Week 9522; Derwent Publications Ltd. London, GB; Class D13, AN 95–166484 & JP-A-07 088 303 (Lion Corp); Apr. 4, 1995; *Zusammenfassung*.
Database WPI, Section Ch, Week 9516; Derwent Publications Ltd. London, GB; Class B04, AN 95–121513 & RU-C-2 018 236 (Canning Fruits Drying Ind Res Inst); Aug. 30, 1994; *Zusammenfassung*.

*Primary Examiner*—Leslie Wong
*Attorney, Agent, or Firm*—Felfe & Lynch

[57] ABSTRACT

A process to extract natural aromas from natural substances containing fat and oil with compressed gases, wherein the natural substances are extracted in two steps in which in the first step liquid propane and/or butane at a temperature of $\leq 70°$ C. and at a pressure of $<500$ bar and in the subsequent second step compressed carbon dioxide at a temperature of $\leq 50°$ C. and at pressures between 70 and 500 bar are used as extraction agents.

12 Claims, No Drawings

PROCESS FOR THE EXTRACTION OF NATURAL AROMAS FROM NATURAL SUBSTANCES CONTAINING FAT AND OIL

BACKGROUND OF THE INVENTION

Modern food technology makes use of numerous processes for processing foods in order to offer the consumer products that are modern and suit the changed food habits. However, in some process steps the original aroma of the starting materials is modified technologically and often adversely influenced because in particular the valuable aroma substances are removed or destroyed. Since however, the sensory properties of the products represent a decisive criterium of quality the food industry strives to compensate for this process-dependent impairment of the products by the targetted addition of aroma substances. Aroma substances that have been isolated from natural sources are preferred above all for this over aroma substances that are identical to the natural substance and especially over artificial substances due to increasingly critical consumer opinion.

From a technological viewpoint the isolation of aromas from natural substances has, however, often proven to be problematic since on the one hand the actual typical sensory impression is determined by the interaction of a number of individual compounds and on the other hand many aroma components are compounds that are destroyed in particular by thermal stress or are unintentionally removed due to their high volatility in the technical process. This problem is very pronounced particularly when aromas are isolated from natural substances containing fat or oil. Additionally in the case of some of these crude substances one tries to isolate aroma fractions which contain as small an amount of fat and/or oil as possible which is an absolute necessity particularly for the production of partially water-soluble instant preparations such as e.g. instant coffee or products having a reduced fat/oil content so-called "light products".

Various processes are known for isolating aromas from natural substances containing fat and oil. Apart from distillation processes e.g. fractional distillation or steam distillation, conventional solvent processes are also used. Processes have recently been described in which the aroma substances have been extracted with compressed gases in particular with supercritical carbon dioxide. For example the European Patent specification EP 0 065 106 describes a process for the production of concentrated extracts of odorous substances and flavourings by extraction with carbon dioxide at supercritical pressure and subcritical temperature. Such processes are at present of great interest in particular due to their mild processing conditions and the high selectivity of the solvent since they enable the production of very high-quality aromas.

In these processes various methods can be used to separate a fat/oil fraction from an aroma fraction with compressed $CO_2$: (i) fractional extraction in which the various components are sequentially extracted from the natural substance by means of different process parameters such as pressure, temperature or feeding in an entraining agent and are collected separately; (ii) fractional precipitation in which the various components are initially extracted together but are then precipitated from the $CO_2$ under different conditions.

However, experience shows that both methods often have disadvantages. Thus in a fractional extraction with compressed carbon dioxide it is often not possible to separately extract the fats and oils effectively from the aroma substances since both classes of substances are readily soluble in carbon dioxide under the same conditions. In the fractional precipitation it is also difficult to effectively separate aroma substances from fat and oil because the solubility characteristics of the two classes of substances in compressed carbon dioxide only minimally differ. Although additional processing steps such as e.g., the addition of auxiliary substances to the extract separator achieve improvements, it is not yet possible to adequately concentrate the aroma components since these are still present to a considerable extent in a lipophilic matrix. It is therefore often not possible to produce aromas with a sufficiently low content of fat and/or oil that would be suitable especially for aromatizing instant drinks or light products.

It is therefore an object of the present invention to create a process for extracting natural aromas from natural substances containing fat and oil with the aid of compressed gases which enables aroma fractions of high sensory quality to be isolated that contain as little fat or oil as possible. A further object is to produce such extracts which have a significantly improved solubility in aqueous media.

THE INVENTION

This object is achieved according to the invention by extracting the natural substances in two steps wherein liquid propane and/or butane is used in the first step at a temperature of $\leq 70°$ C. and a pressure of $<500$ bar and in a subsequent second step compressed carbon dioxide is used at a temperature of $\leq 50°$ C. and at pressures between 70 and 500 bar as an extraction agent.

In this process it surprisingly turned out that in the first step the fats/oils are selectively removed with liquid propane and/or butane whereas the predominant portion of the aroma substances remains in the initial material. This aroma fraction is subsequently extracted in the second extraction step with compressed carbon dioxide. Aroma-containing natural substances which have proven to be particularly suitable for the process according to the invention are for example coffee, cocoa, coconut and peanuts. All other natural substances containing fat and oil as well as aroma substances are, however, also suitable. With respect to the temperature sensitivity of many natural substances the compressed gases in the first step are used in a subcritical but liquid state in which the extraction temperatures are preferably $\leq 50°$ C.

In the first step according to the invention an extraction pressure is selected so that propane and/or butane are kept in their liquid state at appropriate extraction temperature but does not exceed the upper limit of 500 bar. The amount of extracting agent necessary for defatting/deoiling essentially depends on the fat or oil content in the natural substance to be extracted. As a result of the high solubilizing power of the hydrocarbons used under these conditions, in particular of propane for fats and oils, less than 10 kg propane per kg starting material is usually sufficient. By reducing the pressure to below 15 bar it is possible to precipitate the extract containing fat and/or oil at temperatures between 20° and 45° C. towards the end of the first step in the process.

In the subsequent second step of the process, the actual aroma extraction, carbon dioxide is used in a near critical and supercritical state. Process pressure, temperature and amount of gas required are essentially determined within the given limits by the starting material, the remaining aroma fraction and the objective of the extraction. The extraction pressure is between 70 and 500 bar and is preferably between 90 and 280 bar. The extraction temperature is maintained below 50° C. with a view toward the gentle treatment of the product.

The aroma precipitation from the $CO_2$ can be achieved at pressures between 35 and 45 bar and temperatures between 20° and 35° C. In order to improve the water-solubility of the stream it has proven to be advantageous to add solubilizing agents to the carbon dioxide in the extract separator in the form of short-chained alcohols such as ethanol or complexing agents such as cyclodextrins. In the second process step 5 to 30 kg compressed $CO_2$ is preferably added per kg starting material.

The profitability of the process can be improved in that both extraction steps, i.e. defatting and deoiling with compressed hydrocarbons as well as the aroma extraction with compressed carbon dioxide, are technically set up as cyclic processes and are carried out in immediate succession in an extraction plant.

The following examples are intended to elucidate the invention.

EXAMPLE 1

Isolation of a Coffee Aroma from Roasted Coffee 4.7 kg freshly ground roasted coffee was extracted with a total of 37.6 kg liquid propane at 20 bar and 30° C. The extract was precipitated after reducing the pressure to 8 bar and 26° to 42° C. to obtain 705 g of an oily brown extract. 3350 g of the almost fat-free extraction residue was subsequently extracted at 280 bar and 20° C. with 67 kg liquid carbon dioxide. This extract was precipitated by reducing the pressure to 40 bar at 25° C. 45 g of a dark paste-like extract was obtained. It was possible to improve the water-solubility of the extract by adding 10 to 50 g ethanol to the separator during the separation of the carbon dioxide extract. When β-cyclodextrin powder or an aqueous solution thereof was placed in the separator instead of ethanol and the separation was carried out as described, a completely water-soluble aroma extract was also obtained.

The extract isolated by propane contains hardly any volatile aromatic character. In contrast the carbon dioxide extract exhibits the typical fresh roasting aroma of roasted coffee in a high concentration.

EXAMPLE 2

Isolation of a Cocoa Aroma from Cocoa Granulate 250 g of granulated roasted cocoa with a fat content of 10 % by weight was extracted at 20 bar and 20° C. with 1.5 kg liquid propane which almost completely extracted the cocoa butter (25 g extract) (separation conditions as in example 1). Subsequently the extraction residue was extracted at 270 bar and 30° C. with 5 kg liquid carbon dioxide during which it was possible to collect 1 g of an aroma concentrate in the extract separator at 40 bar and 30° C.

The propane extract had a significantly less intensive aroma character whereas the carbon dioxide extract exhibited the sweetish-fresh aroma typical for cocoa.

EXAMPLE 3

Isolation of an Aroma From Roasted Peanuts 1 kg roasted peanuts (roughly-ground) was extracted at 20 bar and 20° C. with 10 kg compressed propane. 450 g peanut oil was obtained in this process (separation conditions as in example 1). Subsequently the extraction residue was extracted at 200 bar and 45° C. with 15 kg compressed carbon dioxide during which 8 g of an aroma extract was obtained in the separator.

The sensory comparison showed that the oil fraction obtained had only a weak aroma effect whereas the quantitatively smaller carbonic acid extract was very full of sensory content i.e. with regard to odour as well as with regard to taste and showed the typical aroma compounds which are expected of roasted peanuts in high concentration.

It will be understood that the specification and examples are illustrative but not limitative of the present invention and that other embodiments within the spirit and scope of the invention will suggest themselves to those skilled in the art.

We claim:

1. A process for the extraction of a natural aroma from a natural, aroma containing substance which also contains fat and/or oil, comprising: extracting fat and/or oil from said natural aroma containing substance using at least one of liquid propane and butane at a temperature of $\leq 70°$ C. and a pressure of <500 bar, to produce a defatted, and/or deoiled, aroma containing fraction; and subsequently extracting the aroma from said aroma containing fraction with compressed carbon dioxide at a temperature of $\leq 50°$ C. and a pressure of from 70 to 500 bar.

2. The process of claim 1, wherein the temperature in the first extraction is $\leq 50°$ C.

3. The process of claim 1, wherein the first extract separation is conducted at a pressure of $\leq 15$ bar and a temperature from 20° to 45° C.

4. The process of claim 1, wherein the carbon dioxide is in a near critical to supercritical state.

5. The process of claim 1, wherein the pressure in the second extraction is between 90 and 280 bar.

6. The process of claim 1, wherein the natural aroma containing substance is contacted with said at least one of liquid propane or butane at a pressure of from 35 to 45 bar, and at a temperature of from 20° C. to 35° C.

7. The process of claim 1, wherein $\leq 30$ kg extracting agent is used per kg starting material in the second extraction.

8. The process of claim 1, wherein solubilizers based on short-chain alcohols or complexing agents are additionally used in the second extraction.

9. The process of claim 8, wherein the solubilizer is ethanol.

10. The process of claim 8, wherein the complexing agent is cyclodextrin.

11. The process of claim 1, wherein the first and second extractions are conducted immediately in succession and as cyclic processes.

12. The process of claim 1 wherein the natural substance is coffee, cocoa, peanuts or coconut.

* * * * *